(No Model.) 6 Sheets—Sheet 3.

R. N. ROSS.
BRICK MACHINE.

No. 329,415. Patented Oct. 27, 1885.

WITNESSES
O. W. Hale
Geo. C. Poulton

INVENTOR
Robert N. Ross,
By his Attorney
W. B. Hale

N. PETERS. Photo-Lithographer, Washington, D. C.

(No Model.)  6 Sheets—Sheet 4.

R. N. ROSS.
BRICK MACHINE.

No. 329,415.  Patented Oct. 27, 1885.

WITNESSES
O. H. Hale
Geo. C. Poulton

INVENTOR
Robert N. Ross,
By his Attorney,
W. B. Hale (No Model.)

R. N. ROSS.
BRICK MACHINE.

No. 329,415.

6 Sheets—Sheet 5.

Patented Oct. 27, 1885.

WITNESSES
P. W. Hale
Geo. C. Poulton

INVENTOR
Robert N. Ross,
By his Attorney
W. B. Hale (No Model.) 6 Sheets—Sheet 6.
R. N. ROSS.
BRICK MACHINE.
No. 329,415. Patented Oct. 27, 1885.
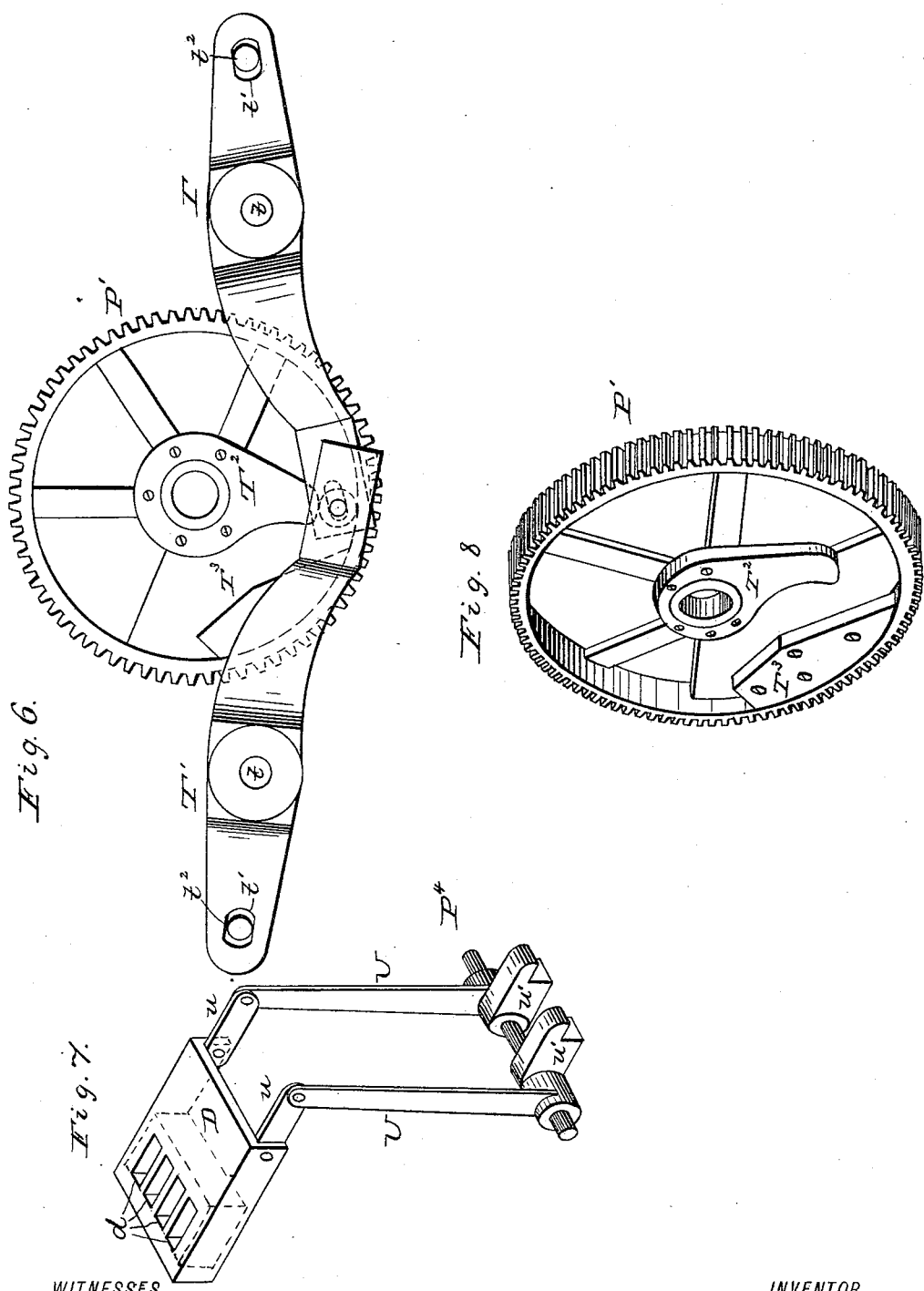

UNITED STATES PATENT OFFICE.

ROBERT N. ROSS, OF ST. LOUIS, MISSOURI.

BRICK-MACHINE.

SPECIFICATION forming part of Letters Patent No. 329,415, dated October 27, 1885.

Application filed March 17, 1885. Serial No. 159,194. (No model.)

*To all whom it may concern:*

Be it known that I, ROBERT N. ROSS, a citizen of the United States, residing at St. Louis, in the county of St. Louis and State of Missouri, have invented certain new and useful Improvements in Brick-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of brick-machines wherein two plungers press the clay between them in the molds, and comprises improvements upon the machine shown and described in Patent No. 293,596, granted to me February 12, 1884, as assignor, by direct and mesne assignments, to the Eureka Brick Machine Manufacturing Company, of Louisville, Kentucky.

The object of my present improvements is to increase the rapidity with which bricks may be pressed with a given expenditure of power, and to cause two separate sets of plungers to operate simultaneously in such manner that the resistance-pressure of each set is utilized in pressing the bricks between the other set.

My present invention will be fully understood from the following particular description, in connection with the accompanying drawings, in which—

Figure 1:
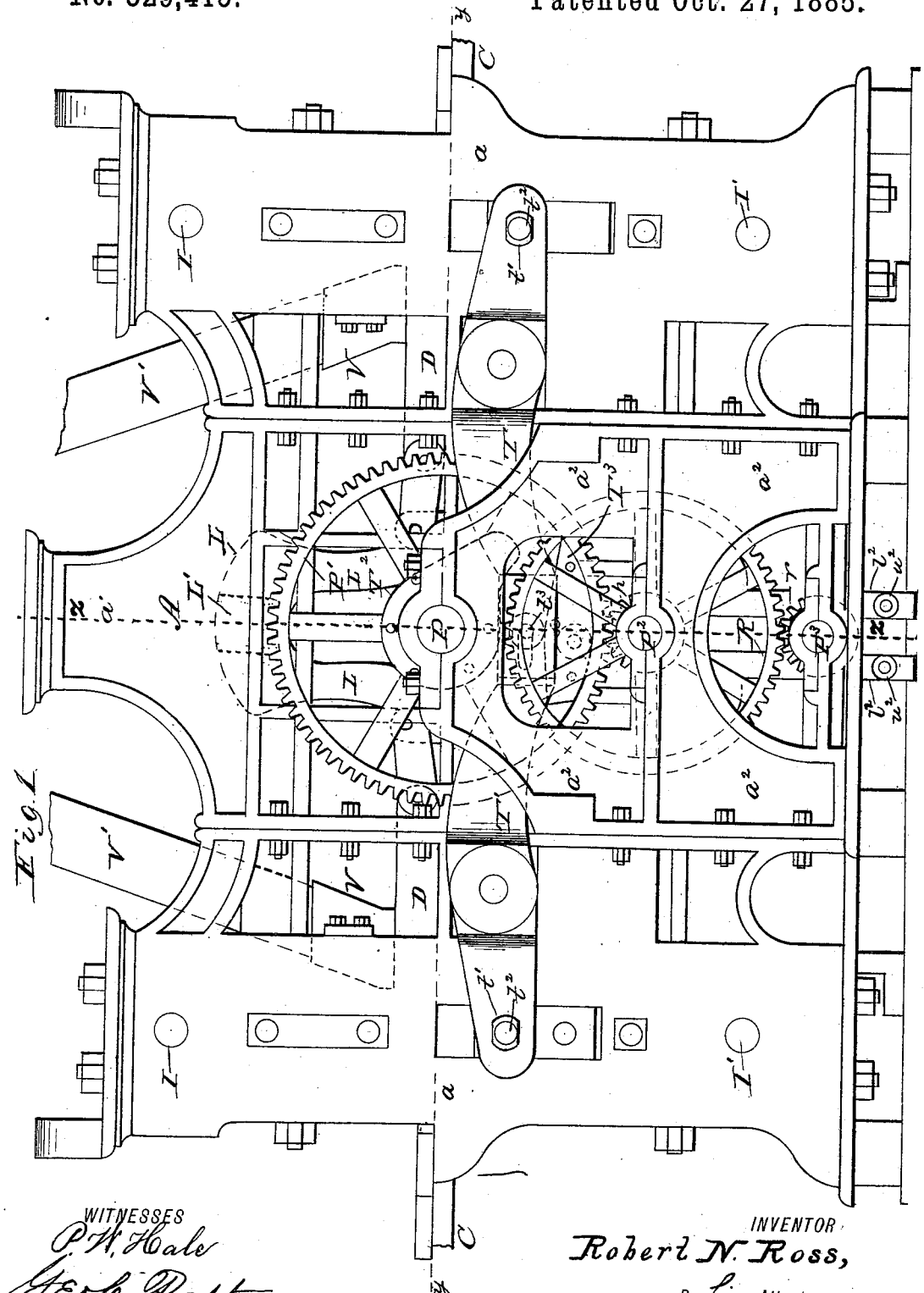
Figure 2:
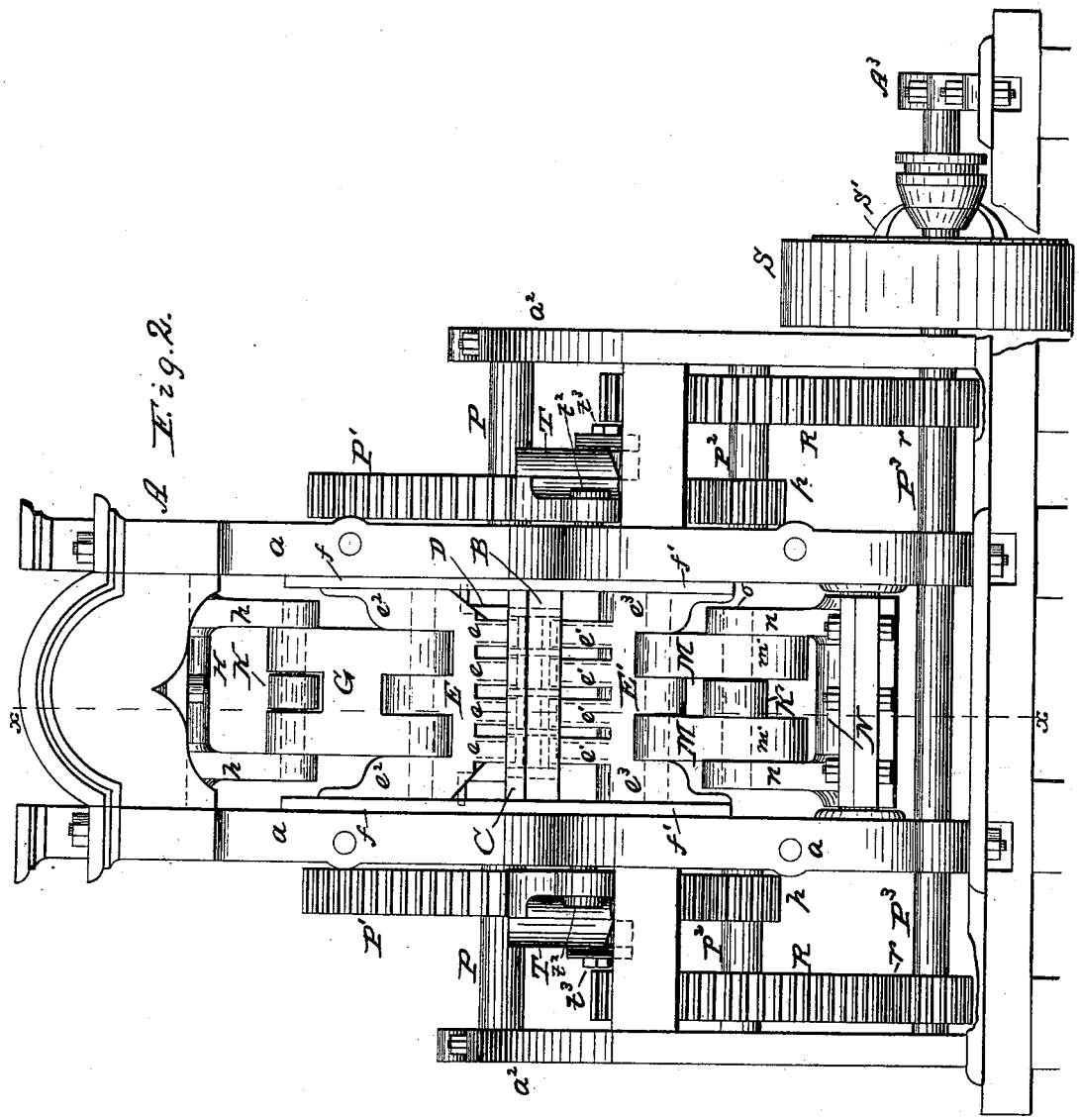
Figure 3:
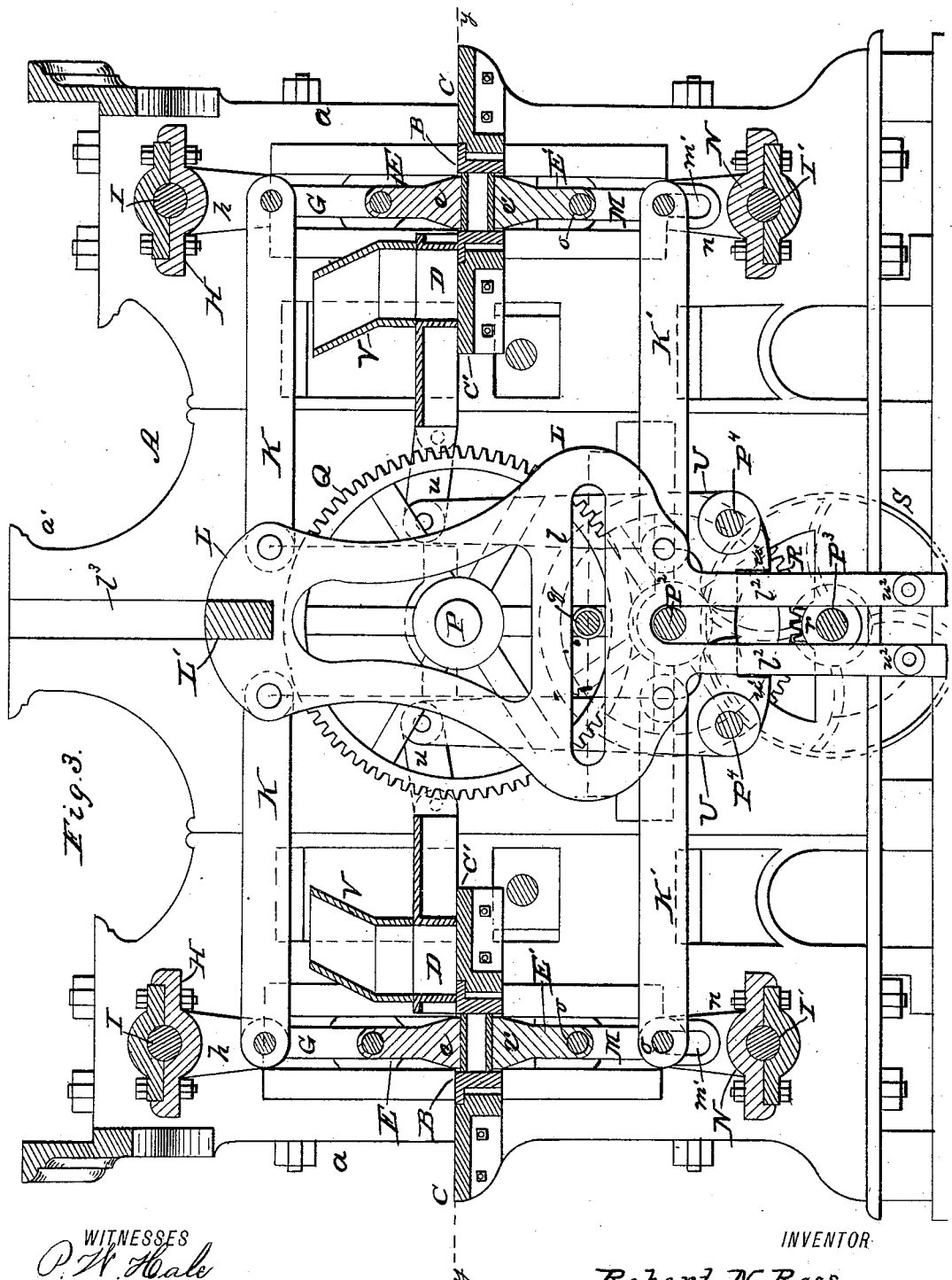
Figure 4:
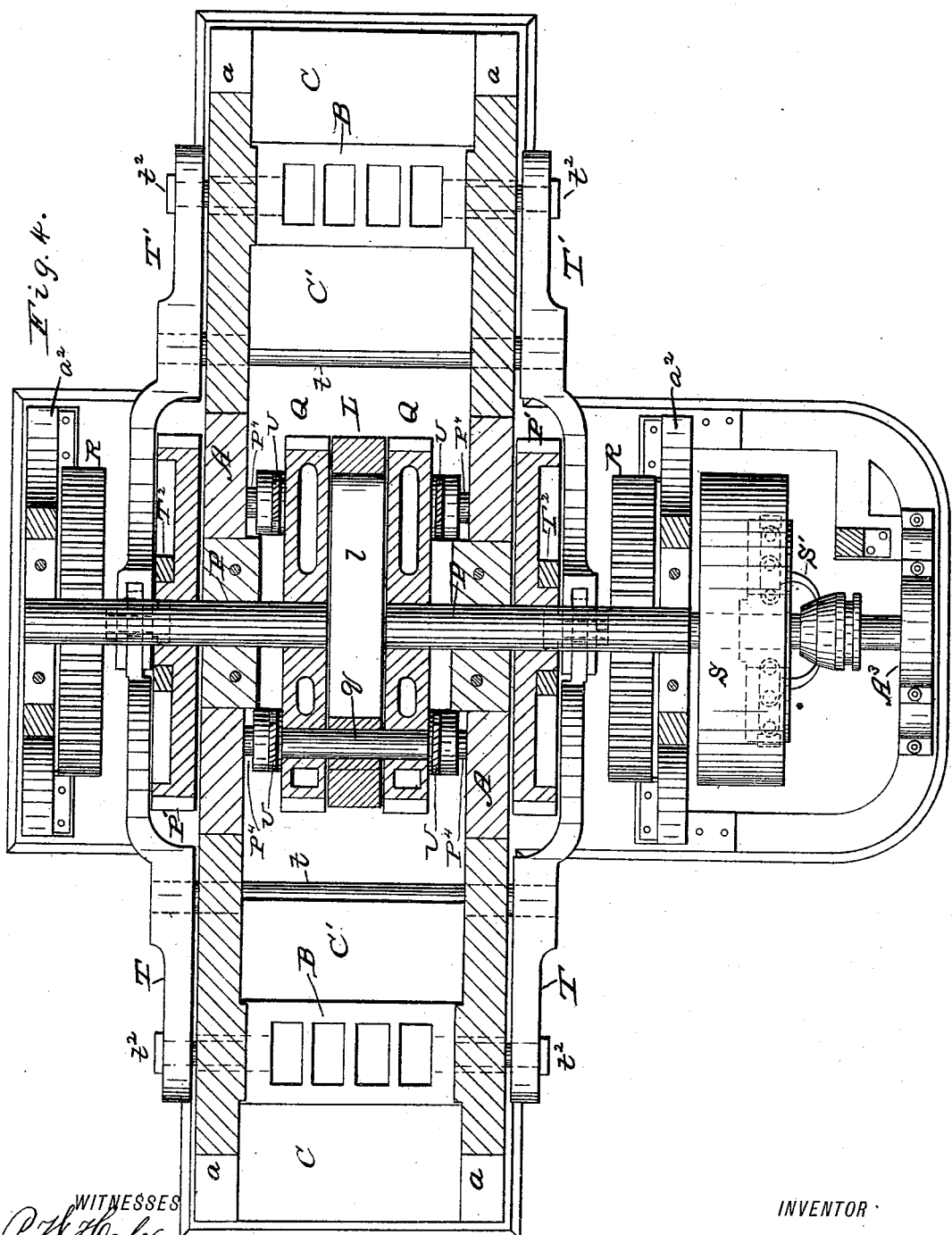
Figure 5:
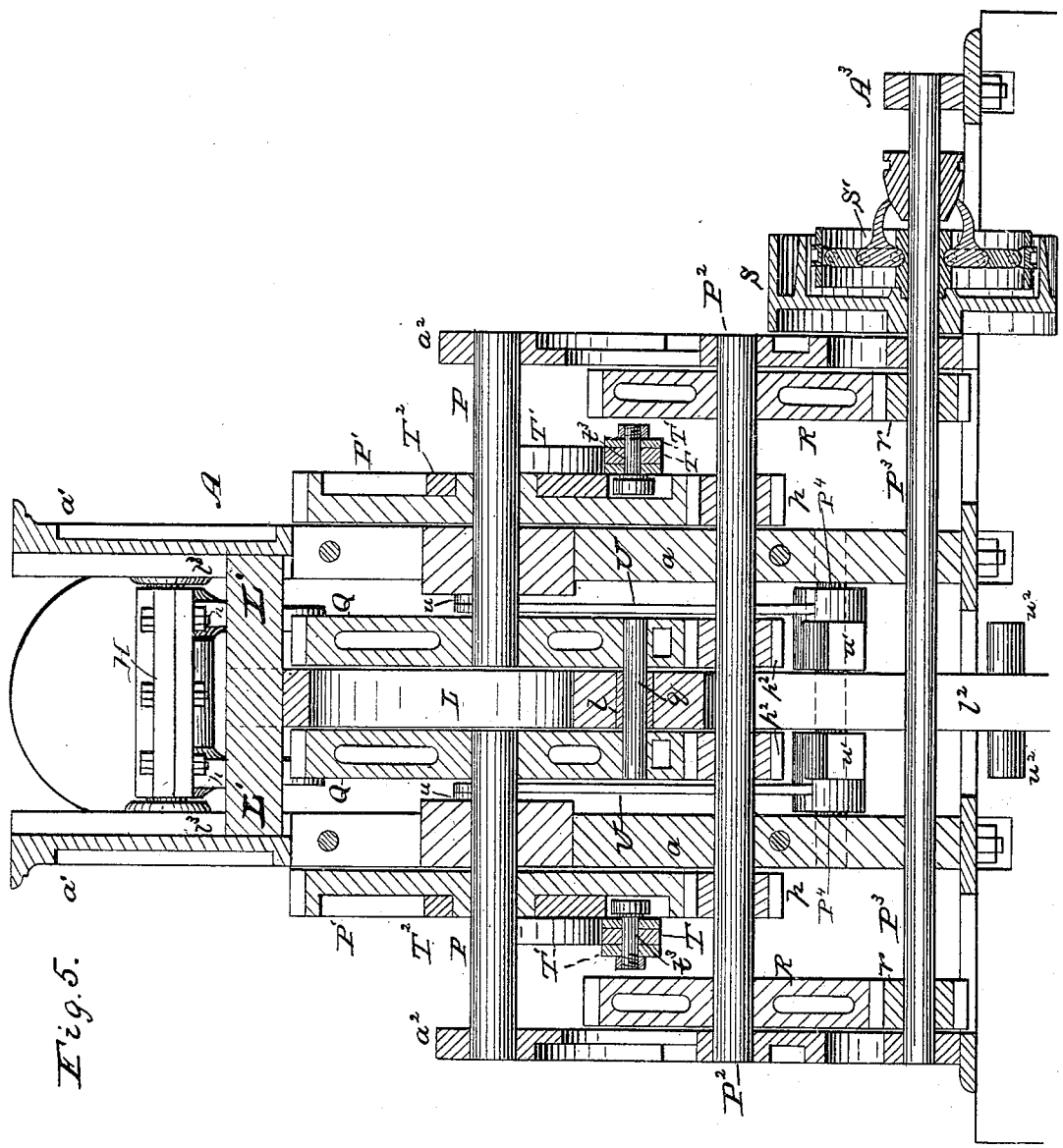

Figure 1 is a side elevation of a double-acting brick-machine constructed according to my invention. Fig. 2 is an end view of the same. Fig. 3 is a vertical section on the line $x\ x$ of Fig. 2. Fig. 4 is a horizontal section on the line $y\ y$ of Fig. 1. Fig. 5 is a vertical cross-section of the machine on line $z\ z$ of Fig. 1. Fig. 6 is a detail side elevation of the discharging-levers and the cam-wheel which operates them. Fig. 7 is a detached perspective view of the charger and its operating-arms. Fig. 8 is a detached perspective view of one of the cam-wheels.

The mechanism at each end of my present machine is substantially the same as the arrangement of plungers, toggles, and molds shown in my patent heretofore referred to; but the plunger-toggles of the present improvement are operated by an intermediate system of toggle-levers and a vertically-moving pitman, instead of by pitmen operated by the wheels, as in my said patent.

Referring now to the drawings, the letter A indicates the housing or frame-work of the machine, which is formed mainly of cast-iron, and of the most substantial character.

The letter B (see Figs. 2, 3, and 4) indicates the brick-molds, each having four compartments or molds proper. The sets of molds are respectively arranged between the side walls, $a\ a$, of the frame-work, at opposite ends thereof, and between two platforms, C and C', supported also between said side walls. The platforms C C are to receive the bricks after they are discharged from the molds, and the platforms C' C' support the chargers D D, which slide back and forth upon them. These chargers and the means for operating them will be hereinafter more particularly described.

The letters E and E' indicate the upper and lower plungers, each having four divisions, as at $e\ e\ e\ e$ and $e'\ e'\ e'\ e'$, to enter the four compartments of the mold. The upper portion of the upper plunger at each end of the machine is expanded laterally, as shown at $e^2$, to fit and slide vertically in guides $f$ on the inner surfaces of the side walls, and the lower plungers are expanded laterally, as shown at $e^3$, to work vertically in similar lower guides, $f'$. To the upper portion of each upper plunger is jointed the lower end of a link, G, the upper end of which is bifurcated, and is pivoted between two arms, $h\ h$, projecting downward from a block, H, which rocks on shaft I, supported between the two side walls, $a\ a$. These arms $h\ h$ and the link G form a toggle-joint for operating the upper plunger at each end of the machine. In the bifurcation of each of the links G is pivoted one end of a toggle-bar, K, the two toggle-bars extending inwardly and pivoted to a vertically-moving pitman, L, which will presently be more particularly described. Each of the lower plungers has jointed to it two links, M M, which extend downward between two arms, $n\ n$, projecting upward from a block, N, which rocks on a shaft, I', supported in bearings in the side walls, $a\ a$. The lower portions of the links M M are slotted, as shown at $m'$, and through the slots of each pair of links passes a heavy pin, o, which connects the upper ends of the arms n n. Between each pair of links M M is pivoted one end of a lower toggle-bar, K', the pin o serving as the pivot thereof. These two lower toggle-bars extend inwardly, and are pivoted to the lower portion of the vertically-moving pitman L, heretofore referred to. This pitman L is simply a vertical heavy bar or plate, of iron or other suitable metal, which is considerably wider at its middle portion than at its ends. At the middle portion of said pitman is a horizontal slot, as shown at $l$, and above this slot is an opening in the pitman simply to lighten it. That portion of the pitman which is below the slot $l$ is bifurcated to form two legs, $l^2$ $l^2$, these legs being for the purpose of straddling certain shafts, which will be hereinafter referred to, and thus guiding the pitman in its vertical movement. From the top of the pitman L arms L' L' (see Figs. 1, 3, and 5) project laterally in opposite directions and enter guide-grooves, as at $l^3$, in the inner surfaces of the upwardly-extended portions $a'$ $a'$ of the side walls, thus serving to hold in proper position the upper end of the pitman during its vertical movement.

The letters $a^2$ $a^2$ designate two exterior side walls on either side of the main frame-work, and of less height than the inner side walls, $a$ $a$. Upon the tops of these exterior side walls and in the inner side walls, $a$ $a$, are journaled two strong shafts, P P, which are in line with but separated from each other by a suitable space at their inner ends. In this space is located the pitman L. The two shafts P P have fixed upon them, respectively, the two gear-wheels P' P' between the exterior walls, $a^2$ $a^2$, and the main frame-work, and at their respective inner ends they carry two similar gear-wheels, Q Q, on opposite sides of the pitman L, and connected by a stout wrist-pin, $q$, which passes through the slot $l$ in said pitman. Below the shafts P P is a single long shaft, $P^2$, having its opposite ends journaled in the exterior side walls, $a^2$ $a^2$, and passing through the main frame. This shaft $P^2$ carries four pinions, two, $p$ $p$, of which engage with the gear-wheels P' P', respectively, and the others, $p^2$ $p^2$, gear with the wheels Q Q. This shaft $P^2$ carries also near its opposite ends gear-wheels R R, which mesh with pinions $r$ $r$ upon a main driving-shaft, $P^3$, journaled at the lower portion of the frame, and extending from the exterior wall at one side of the main frame to a journal-box, $A^3$, located beyond the exterior wall on the other side. Between this journal-box $A^3$ and the frame the shaft $P^3$ carries the belt-wheel S, which runs freely on the shaft, unless locked thereto by means of the clutching devices shown at S', and which need not be particularly described, as they form the subject of prior Letters Patent granted to me. On each side of the main main frame are two arms, T T', which I call the "discharging-arms." They are pivoted on shafts $t$ $t$, and in their outer ends are slots $t'$, through which project pins $t^2$ from the sides of the lower plungers, E', suitable vertical slots being left in the side walls, $a$ $a$, to allow of the passage of said pins and the necessary vertical play of the lower plungers. The inner ends of the arms T and T' lap each other, and the arms T have their lapping ends slotted, while the lapping ends of the arms T' are provided with fixed pins $t^3$, which pass through the slots of the arms T T, and have their inner ends projecting to form wrists, which are acted upon by cams $T^2$ and $T^3$, fixed upon the outer faces of the gear-wheels P' P', these cams being of such shape as to act upon said pins to force down the inner ends of the levers, and thus raise the outer ends, and to raise the inner ends and force down the outer ends. Each of the chargers D is simply a casting having four box-like compartments, $d$, at one end, while its other portion is sufficiently extended inwardly to reach properly over the platform C', so that the box-like compartments may be brought to coincide with the molds for charging the same, and at the same time the rear portion of the charger will close the mouth of the hopper, as in my said Patent No. 293,596. The charger moves between suitable guides, and its inner end is pivoted to links $u$ $u$, having their other ends pivoted to the upper ends of two arms, U U, which are pivoted below upon a shaft, $P^4$, supported by the side walls, $a$ $a$. The devices for moving the charger are the same at both ends of the machine. The arms U stand on opposite sides of the pitman L and the connected gear-wheels which operate it, and they have lower inwardly-projecting portions $u'$ $u'$, which are notched, as shown, to be acted upon by pins $u^2$ $u^2$, projecting from the legs $l^2$ $l^2$ of the pitman L, so that when said pitman rises these pins will vibrate the arms U U, so as to drive the chargers outward and bring their receptacles $d$ over the molds, and withdraw them when the pitman descends. Directly over the chargers are arranged hoppers V, open at the bottom, so that clay from said hoppers will fall into the receptacles of the chargers when the latter are at their inner positions. V' V' indicate clay chutes or conductors, which may lead from a suitable bin or bins, (not shown in the drawings,) and by means of which the hoppers may be constantly supplied with dry pulverized clay, which my machine is mainly intended to mold into bricks. Adjoining the platforms C C may be arranged endless traveling belts for carrying off the bricks, as shown in my Patent No. 293,596, heretofore referred to. Such a belt or apron may be operated by any suitable mechanism, and as it forms no part of my present improvement has not been shown in the drawings.

The operation of my improved machine is as follows: The chargers D being at their inner positions and under the hoppers, and said hoppers supplied with dry pulverized clay, the compartments of the chargers will be filled by the clay falling into them. The power being then applied by means of a belt to the belt-wheel S, and the wheel being clutched to the shaft P³, the machine will be set in operation. At this moment of starting the wrist-pin which connects the gear-wheels Q Q will be at its lowest position, and the pitman L consequently depressed, so that the upper toggle-bars, K K, will straighten the upper toggle-joints, composed of the arms $h\ h$ and links G G, to drive down the upper plungers, E, and at the same time the lower toggle-bars, K' K', will be caused by the pitman L to straighten the lower toggle-joints, composed of the links M and arm $n\ n$. At this time also the cams T³ of the cam-wheels P' will be at such position as to raise the inner ends of the discharging-levers T T' and throw their outer ends down, so that the lower plungers, E', will be down within the molds. When the main driving-shaft P³ begins to turn, the pinions $r$ of said shaft operate the gear-wheels R to turn the shaft P², and the four pinions $p\ p$ and $p^2\ p^2$ operate on the gear-wheels P' P' and Q Q to turn them and the shafts P P. The cams T³ will therefore be moved from under the pins $t^3$, leaving them free to be depressed when the cams T² come around. Now, while the wheels Q Q carry around their connecting wrist-pin, it gradually raises the pitman L, which causes the toggle-bars K and K' to bend inwardly the toggle-joints of the upper and lower plungers, E and E', drawing the former up out of the molds, and sufficiently far above the same to clear the path of the charger, and depressing the lower plungers to the bottom of the molds. When the pitman L reaches nearly its highest position, the pins $u^2\ u^2$, projecting from the legs $l^2\ l^2$, will strike the notched inward-projecting ends of the levers U U, and cause the said levers to drive the chargers forward, so that they will drop into the molds B the clay which they have received from the hoppers, and as the pitman begins to descend a slight movement thereof will, through the same mechanism, cause the chargers to be drawn inwardly under the hoppers and out of the paths of the upper plungers. The continuing downward movement of the pitman L, caused by the wrist-pin $q$, causes the toggle-bars K and K' to straighten the toggle-joints which operate the upper and lower plungers, so that the upper plungers will be forced downward and the lower plungers upward, thus giving the clay a powerful compression between them in the molds, and forming it into bricks at both ends of the machine. It will be observed that the pressure upon one set of bricks furnishes the resistance from which the pressure is exerted upon the other set, so that no power is lost upon a mere dead resistance or abutment, but the entire power exerted is utilized and an equable pressure is maintained upon both sides of the vertically-moving pitman L. After the full pressure is accomplished the wrist-pin $q$, passing the lower center, begins to rise and raise the pitman L, so that the toggle-joints which operate the upper and lower plungers are bent inwardly, and the upper plungers are raised; but at this moment the cams T² begin to operate upon the pins $t^3$, which connect the inner ends of the discharging-levers T and T', depressing the said inner ends and raising the outer ends of said levers, so that they will raise the lower plungers in the molds, said cams being so timed that they will cause the lower plungers to follow the upper plungers with equal speed, to the end that the bricks will be held firmly compressed between the two plungers as they are forced out of the molds, and until the upper plungers have escaped from the molds entirely. Thus there can be exerted upon the bricks no suction by the upper plungers, which would tend to impair their integrity. After the upper edges of the bricks have reached the tops of the molds they will rise less rapidly and the upper plungers will leave them; and as soon as the lower plungers have forced the bricks entirely out of the molds and become flush with the platforms C C' the chargers will be driven forward precisely in the manner first described, and will push the bricks from the lower plungers upon the platforms C C, and the chargers will then be suddenly retracted when the pitman L makes a slight descent by the continued operation of the mechanism, thus bringing all the parts to the positions they occupied at the time of starting the machine. The first sets of bricks formed and the succeeding sets may be removed by hand from the platforms C C, or they may be pushed off by newly-formed sets, which are removed from the plungers by the chargers and shoved upon off-bearing belts or aprons, such as shown in my Patent No. 293,596.

Having now fully described my invention and explained the operation thereof, I claim—

1. In a double-acting or double-end brick-machine, the combination, with the upper and lower plungers and toggle-joints for operating them at the opposite ends of the machine, of the intermediate vertically-moving pitman and the toggle-operating bars connecting said pitman with the toggle-joints of the plungers at the opposite ends of the machine, substantially as described.

2. The combination, with the two sets of upper and lower plungers and brick-molds at the opposite ends of the machine, of the vertically-moving pitman having the horizontal slot, one or more wheels mounted on a shaft or shafts and having a wrist-pin projecting through said slot, suitable means for rotating said wheel or wheels, the toggle-joints for operating said plungers, and the intermediate toggle-operating bars connecting said toggle-joints with said vertically-moving pitman, essentially as set forth.

3. The combination, with the lower plungers and upper plungers operated, substantially as described, for pressing bricks, of the discharge-levers connected with the lower plungers at their outer ends, and the cams arranged to operate the inner ends of said levers, essentially as and for the purpose set forth.

4. The combination, with the chargers and the levers U, connected therewith at their upper ends, of the vertically-moving pitman and devices connected therewith for vibrating said arms, for the purpose set forth.

5. The combination, with the stationary molds at each end of the machine, the upper and lower plungers, and toggle-joints for operating the same, of the vertically-moving pitman, the intermediate toggle-bars connecting said pitman with the toggle-joints of the plungers, the chargers and the arms U, connected thereto at their upper ends, and intermediate devices for communicating an intermitting vibratory motion to said arms from the said pitman, substantially as set forth.

6. In a double brick-machine, the combination, with two sets of molds and plungers, of an intermediate system of toggle-levers and means for operating the same, whereby the power exerted is divided between the two sets of plungers and the resistance offered to the pressure of one set serves to cause a reactionary pressure of the other set, essentially as set forth.

In testimony whereof I affix my signature in presence of two witnesses.

ROBT. N. ROSS.

Witnesses:
HENRY H. KELLER,
WILLIAM L. POOLE.